United States Patent [19]

Urban

[11] 4,256,713

[45] Mar. 17, 1981

[54] FLUE GAS TREATMENT WITH INTERMITTENT ADDITION OF ALKALINE REAGENT TO SCRUBBING LIQUOR

[75] Inventor: Peter Urban, Northbrook, Ill.

[73] Assignee: UOP Inc., Des Plaines, Ill.

[21] Appl. No.: 71,216

[22] Filed: Aug. 30, 1979

[51] Int. Cl.$^3$ .............................................. C01B 17/00
[52] U.S. Cl. .................................................... 423/242
[58] Field of Search .......... 423/242 A, 242 R, 244 A, 423/244 R, 326, 118

[56] References Cited

U.S. PATENT DOCUMENTS 3,989,797  11/1976  Brady et al. ........................ 423/242

*Primary Examiner*—O. R. Vertiz
*Assistant Examiner*—Gregory A. Heller

*Attorney, Agent, or Firm*—James R. Hoatson, Jr.; Louis A. Morris; William H. Page, II

[57] ABSTRACT

An improved process for removing, by absorption, sulfur dioxide from a gaseous mixture such as a flue gas by scrubbing said mixture with an aqueous scrubbing liquor to which a solution of an alkaline reagent such as sodium carbonate is added to maintain alkalinity of the scrubbing liquor. The solution also has dissolved in it a quantity of silica which tends to precipitate when the solution is added to the scrubbing liquor. The silica precipitated in this manner tends to form extremely hard solid deposits in the scrubbing device and associated equipment. The improvement to the process comprises the cyclic, intermittent, batchwise and rapid addition of the alkaline reagent solution to the scrubbing liquor, the addition beginning upon the scrubbing liquor pH reaching a certain minimum value and ending upon the scrubbing liquor reaching a certain maximum value.

5 Claims, No Drawings

FLUE GAS TREATMENT WITH INTERMITTENT ADDITION OF ALKALINE REAGENT TO SCRUBBING LIQUOR

BACKGROUND OF THE INVENTION

1. Field of the Invention

The field of art to which the claimed invention pertains is liquid-gas absorptive separations. More specifically, the claimed invention relates to a process for the absorptive removal of sulfur dioxide from a gaseous mixture by means of a scrubbing liquor.

2. Description of the Prior Art

Due to the ever increasing concern about air pollution, great efforts have been expended in recent years towards the development of processes to reduce the pollutants introduced into the atmosphere from various industrial operations. One of the most onerous of these pollutants is sulfur dioxide which is present in the stacks of flue gases from various operations. For example, $SO_2$ is a primary pollutant released into the atmosphere in the production of sulfuric acid. Also, great quantities of $SO_2$ are produced and passed to the atmosphere in the generating of power, particularly where the fuel used is high in sulfur content.

It has long been known to the art how to abate sulfur dioxide pollution of the atmosphere. The so-called "wet process" is probably the most commonly used process to accomplish such abatement. In the wet process the $SO_2$ containing gas mixture is contacted or "scrubbed" with water in which is dissolved or slurried a reagent, particularly an alkaline reagent, that chemically reacts with the $SO_2$, thus effecting the removal of the $SO_2$ from the gas mixture and incorporating the sulfur originally contained in the $SO_2$ into a non-volatile compound dissolved in the scrubbing water. The sulfur is ultimately removed from the system by the discarding of the scrubbing water in which it is contained, or by removal from the water by further processing.

The alkaline reagent perhaps best known to the art for use in the scrubbing solution for the above wet process is alkali metal carbonate or bicarbonate. The alkali metal carbonate or bicarbonate reacts with the $SO_2$ to yield alkali metal sulfite or bisulfite and $CO_2$. Use of the alkali metal carbonate and specifically sodium carbonate or bicarbonate is particularly advantageous because solutions of that compound are commonly available as an abundant mineral deposit (Trona) occurring in the western part of the United States, and as process-waste streams from industries such as metals production, textiles and paper making. The use of such streams not only cuts operating costs but also permits economies in the capital costs of wet processes because it eliminates the need for equipment to store and mix reagents obtained from other sources. Examples of prior art wet $SO_2$ scrubbing processes which utilize alkali metal carbonates are taught or claimed in U.S. Pat. Nos. 3,962,410; 3,963,825; 3,972,980; 3,984,529; and 3,987,147.

It has been observed that certain inexpensive sources of sodium carbonate or bicarbonate (soda liquor), such as that produced as a by-product from the production of commercial grade sodium carbonate, contain quantities of silica which, when the soda liquor is used in the wet scrubbing process, precipitate and form deposits on the internals of the scrubbing apparatus. These deposits, which are extremely hard solids, interfere with the operation of the apparatus by eventually plugging the pipes and liquid circulating means which are a part of the apparatus. There is no practical way of removing these deposits.

I have discovered an improvement to the wet $SO_2$ scrubbing process in which a silica containing alkali reagent is used, whereby the deleterious effects of the silica are minimized.

SUMMARY OF THE INVENTION

It is, accordingly, a broad objective of my invention to provide an improvement to a process for the absorptive removal of sulfur dioxide from a gaseous mixture by minimizing the deleterious effects of silica present in the scrubbing liquor used in the process.

In brief summary, my invention is a process for the absorptive removal of sulfur dioxide from a gaseous mixture by contacting the gaseous mixture in a scrubbing zone with a scrubbing liquor which comprises a buffered solution of an alkali metal sulfite and bisulfite. The alkalinity of the scrubbing liquor is maintained by adding to it an aqueous alkaline reagent solution having a relatively high pH with respect to the scrubbing liquor. The aqueous alkaline reagent solution has dissolved in it an undesirable quantity of silica contaminant which, upon the addition of the aqueous alkaline reagent solution to the scrubbing liquors, tends to precipitate from solution and form deleterious deposits. These deposits interfere with the functioning of the process. The improvement to the process which minimizes these deleterious deposits comprises the addition of the aqueous alkaline reagent solution to the scrubbing liquor in a cyclic intermittent manner whereby as the pH of the scrubbing liquor falls to a specific minimum value no addition of the aqueous alkaline reagent solution is made. Upon the pH reaching that minimum value the addition is initiated and continued at a rate sufficient to effect the rapid rise of the pH to a specific maximum value. Upon the pH reaching that maximum value, the addition is discontinued and the pH again falls to the minimum value, to complete one phase of the cycle.

Other objectives and embodiments of my invention encompass details about feed mixtures, scrubbing liquor, and operating conditions, all of which are hereinafter disclosed in the following discussion of each of the facets of the present invention.

DESCRIPTION OF THE INVENTION

Sulfur dioxide contained in a gaseous mixture, such as a flue gas, may be removed from the gas in a scrubber by means of an aqueous alkaline reagent solution. The alkaline reagent used in the process of my invention is preferably alkali metal carbonate and bicarbonate and most preferably sodium carbonate and bicarbonate. The overall reaction that occurs when the sodium carbonate/bicarbonate is used is:

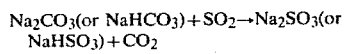

the $Na_2SO_3$ and $NaHSO_3$ are non-volatile and highly water soluble, thereby effectively precluding the possibility of reintroduction of the sulfur into the gaseous mixture in any form.

The typical inexpensive soda liquor source comprises a waste stream or by-product of a wide variety of industrial processes, such as the process for the mining of soda ash. These sources, particularly if obtained from the process for the mining of soda ash, frequently contain an undesirable quantity of silica as a contaminant. The silica will be present in the high pH soda liquor in the form of water soluble sodium silicate having the formula $Na_2O \times SiO_2$, where x may be from 2 to 4. Silicate ions in a high pH aqueous solution tend to form polysilicic acid which comprises a molecular chain having up to four silicon atoms with an SiOH group on one or both ends of the chain.

The soda liquor obtained from the process for the mining of soda ash will contain about 30 wt. % sodium carbonate and about 1 wt. % silica calculated on the basis of silicon dioxide. The pH of this liquor will be about 11.5.

The typical flue gas scrubbing device comprises a vertically elongated chamber with means for introduction of the scrubbing liquor into the upper portion of the chamber and means for introduction of the flue gas into the lower portion. The liquor will be sprayed into the chamber and will flow downward through the chamber thereby coming into initimate contact with the up-flowing flue gas and thus enabling the absorption of the $SO_2$ from the flue gas into the liquor. The liquor drains out of the bottom of the chamber and is recirculated via pump and piping for reintroduction into the top portion of the chamber. A certain amount of the circulating liquor will be removed from the system and an amount of fresh alkaline reagent solution will be added to maintain the necessary alkalinity of the liquor.

The circulating scrubbing liquor will comprise a solution of alkali metal sulfite and bisulfite, the pH of which in prior art processes is maintained from about 7.0 to about 8.0 by continuous addition of alkaline reagent solution which has a relatively high pH with respect to the scrubbing liquor. The silica contained in the alkaline reagent solution will precipitate upon such addition due to insolubility of the silica in the scrubbing liquor at the relatively low pH of the scrubbing liquor. It is this precipitate which forms the aforementioned deleterious deposits on the internals of the scrubber and in the piping and associated equipment servicing the scrubber.

I have found that when the alkaline reagent solution is added to the scrubbing liquor rapidly, i.e. in a slug or over a relatively short percentage of the duration of each cycle, preferably not greater than about twenty-five percent, rather than continuously as in the prior art processes, precipitation of the silica still occurs, but does not form the deleterious deposits. Instead, a gelatinous silica containing material is precipitated in the scrubbing liquor which, when compared to $SiO_2$ scale, is almost completely innocuous. This gelatinous material need not be removed from the scrubbing liquor, because it largely remains in a colloidal suspension that has no effect on the scrubbing operation. The small amount of precipitate that is deposited adheres very loosely and is easily flushed from the system.

Thus, the manner of operation of the flue gas scrubbing device of my invention emphasizes a fluctuating pH in the scrubbing liquor, in contradistinction to the relatively constant pH manner of operation practiced by the typical known art. The fluctuating pH is effected by the batchwise addition of the alkaline reagent solution upon the pH of the scrubbing liquor reaching a certain minimum value as measured, for example, by a pH probe and indicator. The liquid steam valving and pH measuring means of the scrubbing device are preferably programmed by means of instrumentation well known to the art so that the addition of an appropriate amount of the alkaline reagent solution occurs automatically upon the desired minimum pH being reached while at the same time a like amount of scrubbing liquor is withdrawn so as to maintain an essentially constant inventory of recirculating scrubbing liquor in the system. Such addition and withdrawal automatically ceases upon the desired maximum pH being reached.

It is preferred, when the alkaline reagent solution comprises soda liquor obtained from the above mentioned process for the mining of soda ash, that the soda liquor be added to the scrubbing liquor when the pH of the latter falls to a minimum of about 6.5, and that the addition be stopped when the pH of the scrubbing liquor reaches a maximum of about 10.5.

Although the present invention is not intended to be limited to a specific theory, my hypothesis to explain the above advantageous effects relates to the degree of supersaturation of silica in the scrubbing liquor following the addition of the aqueous alkaline reagent solution. When addition is intermittent and in slugs of high volume but short duration, as in the process of the present invention, a very high degree of supersaturation of silica in the scrubbing liquor occurs in the vicinity of where the slug was introduced into the system, and, therefore, in that vicinity a very high concentration of silica containing precipitate will form. This high concentration is conducive to the formation of silica precipitates in the form of a relatively innocuous colloid or gel probably because of the silica first precipitated serving as nucleating sites for subsequently precipitated silica before the first silica is able to deposit on the scrubber internals as scale. The silica precipitate thus forms agglomerates rather than scale. On the other hand, in the prior art processes where the alkaline reagent solution addition is continuous, there is a relatively low degree of silica supersaturation in the scrubbing liquor, silica precipitation gradually occurs and the precipitate is able to deposit as scale on the scrubber internals rather than serve as nucleating sites for subsequently preciptated silica which would enable the formation of agglomerates.

The following examples are intended to further illustrate the process of this invention and are not to be construed as unduly limiting the scope and spirit of said process.

EXAMPLE I

This example presents the results of the practice of the present invention on a laboratory scale $SO_2$ scrubber.

Sulfur dioxide gas from a high pressure cylinder was fed through a rotometer capable of operating in the 0.1 to 0.5 cu. ft./hr. range. Air was fed through a similar rotometer. The two gases were mixed and passed up an absorber vessel comprising a glass cylinder (36 mm. diameter×40 cm. height) filled with York packing material. An initial charge of scrubbing liquor was poured into the top of the absorber column where it passed countercurrent to the flow of the $SO_2$-air mixture and drained into a line connecting a bottom outlet fitting of the absorber to the inlet of a 1/12 horsepower sealless magnetic centrifugal pump. Soda liquor comprising an aqueous solution of 30 wt. % sodium carbonate and 4100 parts per million by weight (ppm), calculated on the basis of elemental silicon, of silica diluted with a sufficient quantity of water to obtain a silicon concentration of 3200 ppm was charged into the system from a 100 cc steam heated buret which emptied into a small pump which pumped the soda liquor through a hydrodermic needle passed through a rubber septrum in a glass "T" piece in the line upstream of the first mentioned pump (hereafter the "sealless pump"). The scrubbing liquor-soda liquor mixture passed through the sealless pump and discharged into a circuit of four pieces of glass tubing (each piece 10 mm diameter×61 cm length). The sealless pump served the dual function of effecting liquid circulation and mixing the soda and scrubbing liquors. The circuit was folded back on itself so as to fit in heating means comprising a tray of hot water maintained at a temperature appropriate to impart a desired temperature to the circulating liquid in the tubing. The purpose of the tubing circuit was to provide a substantial surface area of scrubber internals on which the silica precipitate could deposit and be readily measured. The purpose of maintaining a minimum desired temperature in the tubing circuit was to minimize precipitation due to temperature effects. After passing through the tubes in the tray, the absorber recycle mixture passed through a tube connected to a top inlet fitting of the absorber, thus completing the liquid circuit. A petcock was placed in the circulating line for removal of excess recycle liquor and to draw samples for pH measurement.

All tubing used was 10 mm I.D. glass.

Two test runs, each of six hours duration, were conducted. The first test run was in accordance with the process of the present invention whereby the diluted soda liquor was charged intermittently into the system for five minutes out of a twenty minute cycle time. The soda liquor charge was initiated each time the pH of the circulating liquor fell to the minimum value of a desired range (indicated below with the test run results) and was stopped each time the pH reached the maximum value (also indicated). The second test run was in accordance with the known art processes whereby the diluted soda liquor was charged continuously throughout the run. The operating conditions of the scrubber system during both of the test runs were as follows:

| | |
|---|---|
| SO₂ rate | 0.27 cubic ft./hr. |
| Air rate | 0.5 to 1 cubic ft./hr. |
| Recirculating scrubbing liquor temperature | 53 ± 3° C. |
| Velocity of recirculating scrubbing liquor in tubing | 2 to 3 ft./sec. |

The amount of silica deposits occurring during each run was determined by cleaning out the internals of the tubing circuit and weighing the material thereby obtained.

Following are the results of the test runs:

| Mode of Soda Liquor Addition | Soda Liquor Added (cc) | Absorber Recycle Inventory (cc) | pH Range During Run | Deposits Total (gms) |
|---|---|---|---|---|
| Intermittent | 452 | 310 | 6.5- 7.6 | 0.62 |
| Constant | 466 | 300 | 7.4- 8.0 | 1.03 |

It is apparent from the above results that when the addition of the soda liquor was intermittent, in accordance with the process of the present invention, the deposits made on the tubing circuit internals was considerably minimized as compared to the results involving continuous soda liquor addition.

EXAMPLE II

The purpose of this example is to present results of a test run for the practice of the present invention on a pilot plant scale SO₂ scrubber. Also presented are comparative results of a test run of a prior art process carried out on the same scrubber.

In the pilot plant SO₂ scrubber, sulfur dioxide was absorbed out of an SO₂ air mixture by an aqueous solution of sodium sulfite-bisulfite which comprised the scrubbing liquor. The pH of the scrubbing liquor was maintained by the addition (intermittent in accordance with the present invention and continuous for the prior art process) of an aqueous alkaline reagent solution (soda liquor) comprising a solution of sodium carbonate contaminated by some soluble silica and diluted with deionized water to give a sodium carbonate content of 17 wt. % and a silicon content of 1560 ppm (wt). Plant conditions and charge streams for each test run were as follows:

- Temperature: 38–40° C.
- Recycle rate: 300 gals./hour.
- Time: 72 hours.
- SO₂ in: 24.6 moles (no SO₂ out).
- Initial charge of absorber recycle solution: 7500 cc
- Air: 2 SCFM.

Like with the laboratory scale test run of Example I, the test run of the pilot plant simulating the process of the present invention involved initiating the soda liquor charge each time the pH of the circulating liquor fell to the minimum value of a specific range and was stopped each time the pH reached the maximum value. Also, like with the laboratory scale test runs of the present invention, the intermittent flow of the soda liquor into the pilot plant occurred for about five minutes out of each twenty minute cycle.

Following is a compilation of the data from the two runs:

| Mode of Soda Liquor Addition | Grams Diluted Soda Liquor Added | Ph Range During Run | Grams Si Recovered By Caustic Wash |
|---|---|---|---|
| Intermittent | 14,031 | 6.85-7.2 | 2.34 |
| Constant | 14,031 | 6.9-7.0 | 3.64 |

The above results again show the reduction in deposits on the scrubber internals achieved by the process of the present invention.

I claim as my intention:

1. In a process for the absorptive removal of sulfur dioxide from a gaseous mixture by contacting said gaseous mixture in a scrubbing zone with a scrubbing liquor comprising a buffered solution of an alkali metal sulfite and bisulfite, the alkalinity of said scrubbing liquor being maintained by the addition thereto of an aqueous alkaline reagent solution comprising sodium carbonate, sodium bicarbonate or both having a relatively high pH with respect to said scrubbing liquor, said aqueous alkaline reagent solution having dissolved therein an undesirable quantity of silica contaminant which, upon the addition of said aqueous alkaline reagent solution to said scrubbing liquor, tends to precipitate from solution and form deleterious deposits which interfere with the functioning of said process, the improvement which comprises the minimization of said deleterious deposits by effecting said addition of said aqueous alkaline reagent solution to said scrubbing liquor in a cyclic intermittent manner, whereby as the pH of said scrubbing liquor falls to a specific minimum value of not less than about 6.5 no addition of said aqueous alkaline reagent solution is made, upon said pH reaching said minimum value of not less than about 6.5 said addition is initiated and continued at a rate sufficient to effect the rapid rise of said pH to a specific maximum value of not greater than about 10.5, upon said pH reaching said maximum value of not greater than about 10.5 said addition is discontinued and said pH again falls to said minimum value of not less than about 6.5 to complete one phase of said cycle.

2. The process of claim 1 further characterized in that said gaseous mixture comprises a flue gas.

3. The process of claim 1 further characterized in that said aqueous alkaline reagent solution comprises an aqueous solution having a pH of about 11.5 and containing about 30 wt. % sodium carbonate and about 1 wt. % silica calculated on the basis of silicon dioxide.

4. The process of claim 1 further characterized in that said intermittent addition of said aqueous alkaline reagent solution is made over periods of time comprising not greater than about twenty-five percent of the duration of each of said cycles.

5. The process of claim 1 further characterized in that during the occurrence of said addition of an amount of said aqueous alkaline reagent solution to said scrubbing liquor a like amount of scrubbing liquor is removed from the inventory of scrubbing liquor.

* * * * *